No. 710,913. Patented Oct. 7, 1902.

A. G. HOEFER.
WIRE FENCE.
(Application filed Mar. 15, 1902.)

(No Model.)

Witnesses:
Frank J. Blanchard
Mary Daly

Inventor:
August G. Hoefer.
By N. N. Morrison,
Attorney

THE NORRIS PETERS CO., PHOTO-LITHO., WASHINGTON, D. C.

UNITED STATES PATENT OFFICE.

AUGUST G. HOEFER, OF FREEPORT, ILLINOIS, ASSIGNOR TO HOEFER MANUFACTURING COMPANY, OF FREEPORT, ILLINOIS, A CORPORATION OF ILLINOIS.

WIRE FENCE.

SPECIFICATION forming part of Letters Patent No. 710,913, dated October 7, 1902.

Application filed March 15, 1902. Serial No. 98,437. (No model.)

*To all whom it may concern:*

Be it known that I, AUGUST G. HOEFER, a citizen of the United States of America, residing at Freeport, in the county of Stephenson and State of Illinois, have invented a certain new and useful Improvement in Wire Fences, of which the following is a specification.

The object of this invention is the production of a wire fence provided with barbs so arranged as to successfully repel animals without being in danger of seriously wounding them, as is the case when their horizontal strand-wires instead of their vertical stay-wires are armed with barbs; and it consists in the features of construction and combination of parts hereinafter described and claimed.

Figure 1:
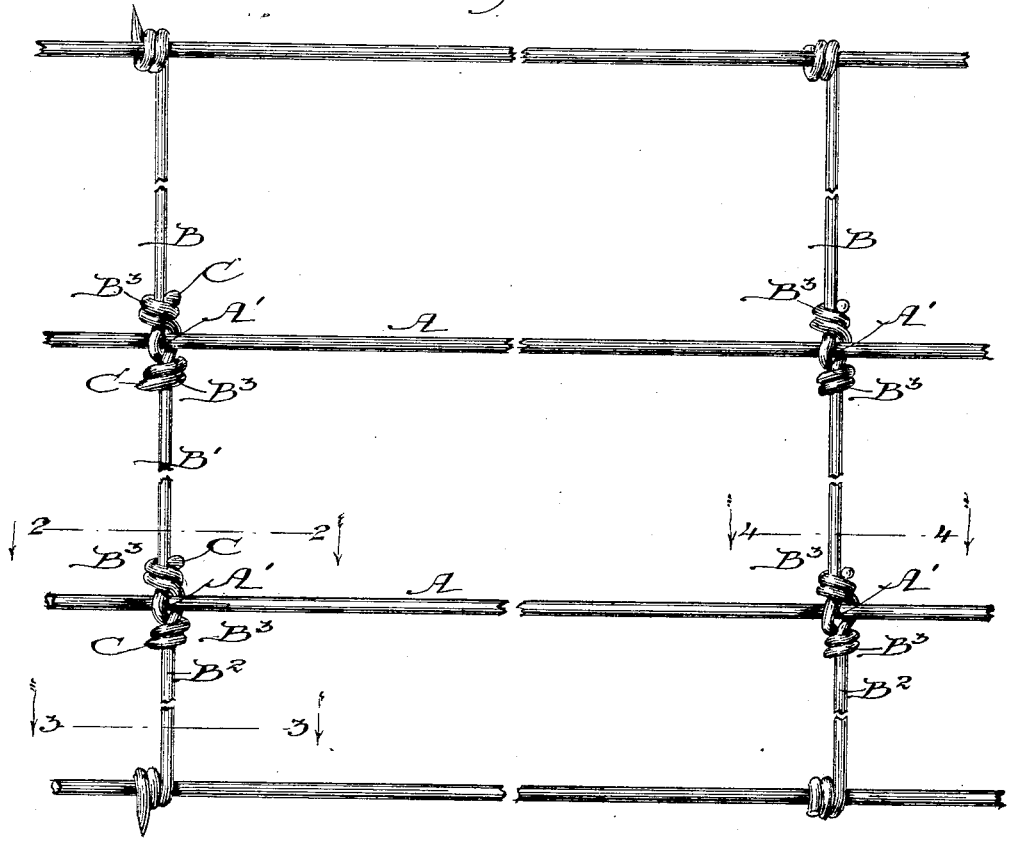
Figure 2:
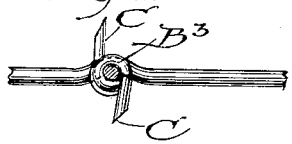
Figure 4:
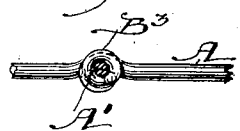
Figure 3:

Referring to the accompanying drawings, which form a part of this specification, Figure 1 is an elevation of a section of a panel of a wire fence embodying my improvements. Fig. 2 is a detail as viewed from 2 2 in Fig. 1 of parts there shown. Fig. 3 is a detail as viewed from 3 3 in Fig. 1 of parts there shown. Fig. 4 is a detail as viewed from 4 4 in Fig. 1 of parts there shown.

Like letters of reference indicate corresponding parts throughout the several views.

A represents horizontal strand-wires provided with vertically-registering crimps A' formed therein and secured to posts in the usual or any desired manner.

B B' B² are sections comprising the vertical stay-wires of the fence, the ends B³ whereof project transversely across on opposite sides of and contact the crimps A' in the horizontal strand-wires A and lap by and are coiled tightly around each other, thereby firmly securing the horizontal strand-wires A between the coils B³, connecting such sections B B' B² of the vertical stay-wires. The ends of the coils B³ of each section of the vertical stay-wires may be extended and pointed to form barbs C, or they may be left barbless, as in the right-hand vertical stay-wire, Fig. 1.

This fence is of simple construction and at the same time strong and durable, taking the place of a barb-wire fence with very slight liability of causing injury to animals, as is the case with ordinary barb-wire fences.

What I claim as new, and desire to secure by Letters Patent, is—

A wire fence comprising a series of horizontal stay-wires provided with vertically-registering crimps formed therein and vertical stay-wires, each vertical stay-wire being composed of sections, the ends whereof project transversely across, on opposite sides of, and contact the crimps in, the horizontal strand-wires, and lap by and are coiled tightly around each other, substantially as and for the purpose specified.

In testimony whereof I have signed my name to this specification in the presence of two subscribing witnesses.

AUGUST G. HOEFER.

Witnesses:
F. W. HOEFER,
C. E. HOEFER.